United States Patent [19]

Westell et al.

[11] 4,197,583
[45] Apr. 8, 1980

[54] IMAGE DISPLAY SYSTEM

[75] Inventors: William E. Westell, Weston, Mass.; Raymond P. Grenier, Northbrook, Ill.; Johan A. Govaert, Peabody, Mass.

[73] Assignee: Baird Corporation, Bedford, Mass.

[21] Appl. No.: 902,437

[22] Filed: May 3, 1978

[51] Int. Cl.² ............................ G06F 3/14; G01T 1/20
[52] U.S. Cl. ................................ 364/521; 250/363 S; 358/280; 364/414
[58] Field of Search ............................... 364/515–521, 364/414; 358/280, 283; 250/363 S, 367

[56] References Cited

U.S. PATENT DOCUMENTS

| 3,904,816 | 9/1975 | Taudt et al. ........................... 358/280 |
| 4,004,079 | 1/1977 | Boston ................................. 358/280 |
| 4,044,332 | 8/1977 | Grenier ................................ 358/283 |
| 4,055,766 | 10/1977 | Miller et al. ...................... 250/363 S |
| 4,075,483 | 2/1978 | Tancrell et al. .................. 250/363 S |

OTHER PUBLICATIONS

Jarvis et al., A New Technique for Displaying Continuous Tone Images on a Bilevel Display IEEE Transactions on Communications, Aug. 1976, COM-24, No. 8 pp. 891–898.

Primary Examiner—Felix D. Gruber
Attorney, Agent, or Firm—Morse, Altman, Oates & Bello

[57] ABSTRACT

A display system in which a video signal derived from digital data is processed in a processor in order to produce an analog image of the digital data on a cathode-ray tube display by intensity modulation of the display beam according to an approximate two-dimensional Gaussian spread function centered about each digital data point.

14 Claims, 3 Drawing Figures

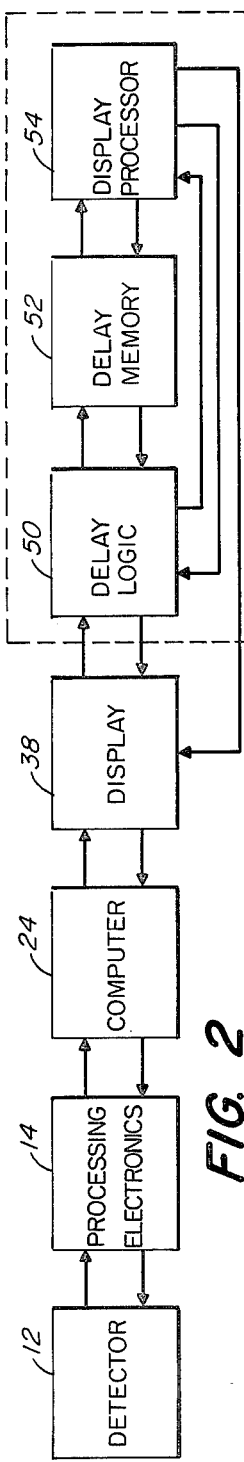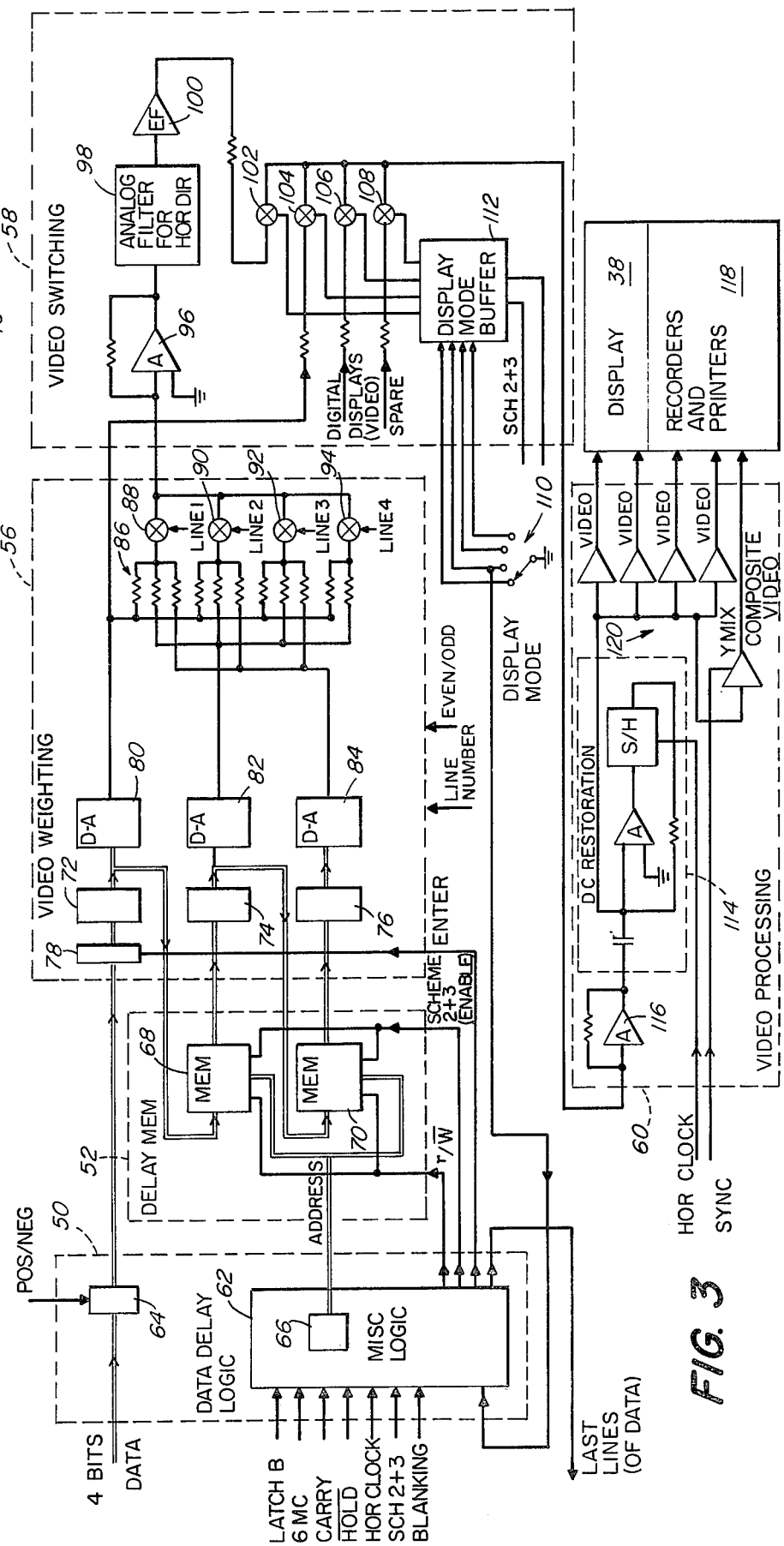
FIG. 2
FIG. 3

IMAGE DISPLAY SYSTEM

BACKGROUND OF THE INVENTION

1. Field of the Invention

The present invention relates to display systems and more particularly, is directed towards display systems for presentation of an analog image of digital data.

2. Description of the Prior Art

Two-dimensional images that have been spatially-sampled, for example in computer processing, generate display artifacts due to aliasing, leakage and data quantization if the digital image data is simply converted to analog intensity values and is displayed directly. These artifacts seriously degrade the quality of image perception. In nuclear medicine in particular, image display requirements are manifold, since not only basic anatomy and morphology are being investigated, as a standard X-ray or computerized tomography scan procedure, but also complex multiple physiological functions such as cerebral blood flow, myocardial perfusion, renal flow, cardiac wall motion, and the like.

The inherently discrete characteristic nature of digital data resulting from computer processed images has been a deterrent to the diagnostic interpretation of the images by people educated, trained, and familiar with continuous analog images. The quantum nature of discrete boundaries in both the shades of grey and the picture element spatial borders create high frequency noise which essentially degrades the image resolution available to the viewer. Digitial displays associated with computer processed scintigrams have added to the existing problem of learning how to interpret a new study of body function, the burden of learning to interpret a different display. A need has arisen for a display system which does not suffer from the heretofor mentioned disadvantages and limitations.

SUMMARY OF THE INVENTION

It is an object of the present invention to provide a computer image display system and processor which does not suffer from the heretofor mentioned disadvantages and limitations.

Another object of the present invention is to provide a computer image display system and processor employing non-critical and practical techniques.

A further object of the invention is to provide a display system for presentation of an analog image of computer sampled digital data.

A still further object of the invention is to provide a computer image display system which includes a display processor having a two-dimensional Gaussian interpolation filter. An analog image of computer processed digital sampled data is presented on a cathode-ray tube display by intensity modulation of the cathode-ray tube display according to an approximate two-dimensional Gaussian spread function centered about each digital point, the Gaussian function providing data smoothing having rotational symmetry of the final display response. The processing of the sampled digital data is performed by simple sequential operation on X and Y coordinate data. The equivalent one-dimensional Gaussian function is first convolved vertically with computer stored intensities in a vertical slice of interest. That is, the Gaussian function is multiplied by intensity values in a vertical slice and summed to derive resultant intermediate values at each point on a given horizontal line. The same equivalent one-dimensional Gaussian function is then convolved with these resultant intermediate values on a given horizontal line in order to derive final values which are to be displayed.

Other objects of the present invention will in part be obvious and will in part appear hereinafter.

The invention accordingly comprises the methods and systems, together with their steps, parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 2 is a block diagram of the continuous tone image processor of FIG. 1; and

FIG. 3 is a schematic diagram of the continuous tone image processor of FIG. 2.

DETAILED DESCRIPTION OF THE PREFERRED EMBODIMENTS

Figure 1:
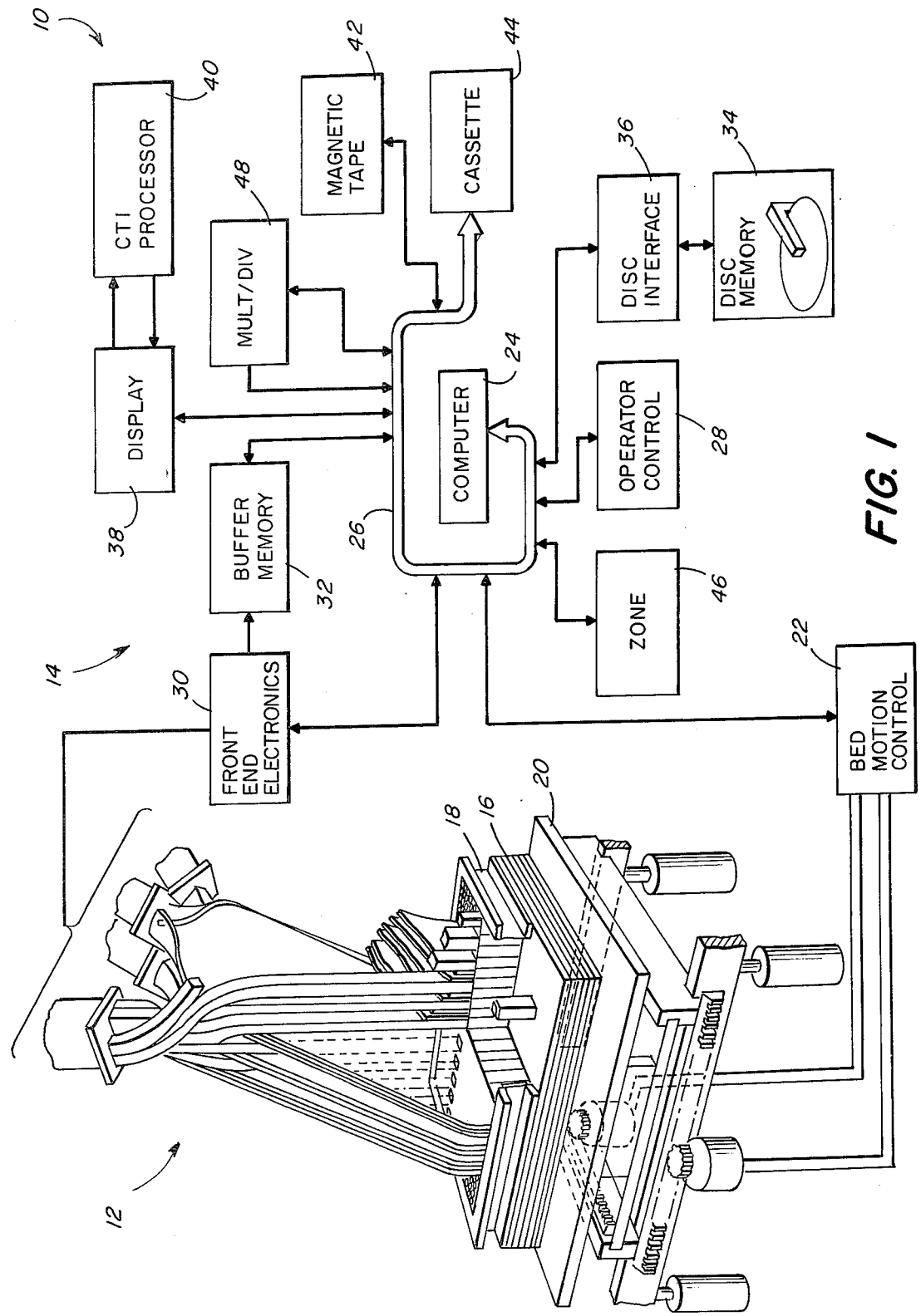
FIG. 1 is a block diagram of an image display system embodying the invention.

Referring now to the drawings, particularly FIG. 1, there is shown an image display system 10 embodying the present invention for computer processing and display of data defining the conditions of a biological specimen following administration of a diagnostic amount of radioactive material. System 10 comprises a detector assembly 12 and processing electronics 14. Detector assembly 12 includes a collimator 16 and an array 18 of individual scintillators. In the illustrated embodiment, collimator 16 is a multi-plane focused collimator characterized by at least two different focal lengths. A subject under diagnosis (not shown) is positioned on a programmable XY bed 20 which is in spaced relationship to detector assembly 12, a section of the subject under diagnosis being in registration with collimator 16. Movement of bed 20 is controlled by a bed motion control 22 which is responsive to command signals initiated by a general purpose computer 24. Signals are fed to and transmitted from computer 24 via a computer bus line 26.

In response to command signals initiated from an operator console 28, computer 24 generates control signals that are applied to bed motion control 22. In consequence, scanning signals which operate to move bed 20 in a specified scanning pattern are generated by bed motion control 22. Individual scintillation events in detector assembly 12 are sensed and the coordinate position of each event is digitized in front-end electronics 30. All acceptable data sensed by detector assembly 12 and passed through front-end electronics 30 is accumulated and sorted in a buffer memory 32. Each event sensed at a particular XY location of the subject, defined by the XY position of bed 20 with respect to detector assembly 12, is addressed into buffer memory 32 and accumulated to previous events having the same address. The number of events stored at a given address is the number of recorded disintegrations having originated within the monitored subject at a point, the XY location of which corresponds to the given address. Following the accumulation period, the accumulated data in raw digital form is transferred to a rotary disc memory 34 from computer 24 via a disc interface 36 for storage. Instructions for control of the systems operations are contained in rotating memory 34. In response to command signals generated from operator console 28, the stored data is read from rotating disc memory 34 and applied to a display 38 via computer 24 for data presentation. A continuous tone image processor 40 which is interconnected to display 38 is provided for presenting an analog image of stored digital data on display 38. A magnetic tape assembly 42 is provided for permanent bulk storage of data in a retrievable computer-compatible form. Rapid loading of new programs into computer 24 is accomplished by means of a cassette 44 which also is available for storage of data. A zone unit 46 is provided as a means for the operator to select particular zones of interest of the data presented on display 38. A multiply/divide assembly 48 is provided for increased efficiency of the system by decreasing operational time. The details of detector assembly 12 and processing electronics 14, with the exception of continuous tone image processor 40, are described in the U.S. Pat. No. 4,048,501, incorporated herein by reference.

Referring now to FIG. 2, it will be seen that continuous tone image processor 40 includes a delay logic 50, a delay memory 52 and a display processor 54. Digital data signals representing the conditions of the biological specimen under investigation at the output of processing electronics 14 are applied to display 38 via computer 24. Delay memory 52, which is interconnected with display 38 via delay logic 50, is provided for storage of the processed data. As hereinafter described, the stored processed data is processed in display processor 54 and fed to display 38 for analog image presentation of the digital data. Continuous tone image processor 40 generates a video signal which produces an analog image of digital data on display 38, for example a cathode-ray tube television monitor, by intensity modulation of the cathode-ray tube scan beam according to an approximate two-dimensional Gaussian spread function centered about each digital data point. The spread function is matched to system 10 resolution response function.

The invention, described in the context of the standard TV format, makes each TV display pixel intensity proportional to the Gaussian weighted sum of computer stored intensity values in accordance with the following procedure:

(1) The standard deviation ($\sigma$) of a Gaussian matched filter is determined from the optical transform function (OTF) and sampling rate. The two-dimensional (x-y) imaging system spread function (impulse response or weighting function) approximated by $$\frac{1}{2\pi\sigma^2} e^{-\frac{1}{2}\frac{x^2+y^2}{\sigma^2}}$$

(where $\sigma$ is the standard deviation of the spread function) is the inverse Fourier Transform of the system OTF which is approximated by $$e^{-1/2[(\omega_x\sigma)^2+(\omega_y\sigma)^2]}.$$

Since typical imaging systems have a symmetrical or even spread function, the optimum matched filter spread function which minimizes detector and/or shot noise is identical to the system spread function. Analysis has shown the Gaussian function to be an excellent approximation, in the matched filter sense, to typical imaging system spread functions. Matching is effected by equating full-width-half-maximums (FWHM). The Gaussian function $$\frac{1}{2\pi\sigma^2} e^{-\frac{1}{2}\frac{x^2+y^2}{\sigma^2}}$$

has a FWHM approximately equal to 2.35 $\sigma$. The match is non-critical due to the Gaussian functional properties. The sampling rate is chosen to satisfy the Nyquist Limit with respect to the product of system input image spectrum and system OTF.

(2) This Gaussian function is first convolved vertically with computer-stored intensities in the vertical slice of interest, i.e. multiplied by those intensity values in the vertical slice and summed to derive the resultant intermediate value on a given horizontal line.

(3) This same Gaussian function is then convolved with the resultant intermediate values on a given horizontal line to derive the final value to be displayed.

It should be noted that the vertical and horizontal convolutions are performed sequentially. The unique property of the Gaussian function, having the same canonical form for both transform and inverse transform, leads to the desired properties of rotational (circular) symmetry of both the spread function and transform (OTF), and of two-dimensional convolutions equivalent to sequential convolutions of the one-dimensional spread functions (equivalent to sequential multiplications of the one-dimensional transform in the image transform domain).

Thus the two-dimensional matched filter Gaussian transform (OTF) and its inverse transform (Gaussian spread function) are invariant with rotation. This means that the final display image will have no change in the apparent image structure perceived as the system input image in object space is moved, or is rotated, or is translated normal to the system optical axis, or is translated parallel to the system optical axis (zoomed).

The properties and advantages described above are made evident by an examination of the mathematical descriptions of the Gaussian-function matched filter, which has a computer-display spread function (weighting function) given by:

$$h(X-x_i, y-y_i) = \frac{1}{2\pi\sigma^2} e^{-\frac{1}{2}\frac{(x-x_i)^2+(y-y_i)^2}{\sigma^2}} \quad (1)$$

where X, Y are the horizontal and vertical coordinates of the display image points, and $X_i$, $Y_i$ are the computer data-input points. The spread function standard deviation is matched to the imaging system FWHM by scaling $\sigma$ to achieve:

$$\sigma = \frac{FWHM}{2.35} \quad (2)$$

This weighting function has an OTF: $F(\omega_x, \omega_y)$ given by:

$$F(\omega_x,\omega_y)=e^{-1/2[(\omega_x\sigma)^2+(\omega_y\sigma)^2]} \quad (3)$$

where $\omega_x, \omega_y$ are the horizontal and vertical spatial frequencies of the display image. This represents the spatial frequency content for a single data point input to the matched filter. This OTF was derived from the two-dimensional Fourier Transform of the matched-filter spread function:

$$F(\omega_x, \omega_y) = \int_{-\infty}^{+\infty} \int_{-\infty}^{+\infty} h(x, y) e^{-j\omega_x x - j\omega_y y} \, dx \, dy \quad (4)$$

The circular symmetry of the Gaussian matched-filter spread function is shown in the space domain from:

$$h(x - x_i, y - y_i) = h(r) = \frac{1}{2\pi\sigma^2} e^{-\frac{1}{2} \frac{r^2}{\sigma^2}} \quad (5)$$

where:

$$r^2 = (x - x_i)^2 + (y - y_i)^2 \quad (6)$$

and is shown in the spatial-frequency domain (OTF) from $$F(\omega_x, \omega_y) = F(\omega_r) = e^{-1/2(\omega_r \sigma)^2} \quad (7)$$

where $$\omega_r^2 = \omega_x^2 + \omega_y^2 \quad (8)$$

The Gaussian function also provides multiplicative separability of vertical and horizontal components in the matched-filter convolution integral which gives the computer-display brightness B (x,y):

$$B(x, y) = B_o \int_{-\infty}^{+\infty} \int_{-\infty}^{+\infty} f(x_i, y_i) h(x - x_i, y - y_i) dx_i dy_i \quad (9)$$

where $f(x_i, y_i)$ represents the computer data-input function, and $B_o$ is the display-brightness scale factor, a display-system constant.

The multiplicative separability, which permits sequential (vertical and horizontal) convolutions, now is shown by substitution of the Gaussian matched-filter expression into the brightness convolution integral:

$$B(x, y) = \frac{B_o}{2\pi\sigma^2} \int_{x_i=x_{min}}^{x_i=x_{max}} e^{-\frac{1}{2}\left(\frac{x_i - x}{\sigma}\right)^2} \int_{y_i=y_{min}}^{y_i=y_{max}} e^{-\frac{1}{2}\left(\frac{y_i - y}{\sigma}\right)^2} f(x_i, y_i) \, dy_i \, dx_i \quad (10)$$

As previously indicated, continuous tone image processor 40 produces an analog image on display 38 by intensity modulation of the cathode-ray tube scan beam according to a two-dimensional Gaussian spread function centered about each digital data point. In the illustrated embodiment, by way of example, the point spread function operates over about three center to center distances of data points. That is, the intensity at any point on the screen of television monitor 28 is the sum of the components of the intensity distributions resulting from up to nine data points. In order to generate the proper intensity at any given time, three data points in the vertical direction and three data points in the horizontal direction are used. The details of continuous tone image processor 40 are shown in FIG. 3.

Referring now to the detailed schematic of FIG. 3, it will be seen that display processor 54 includes a video weighting unit 56, a video switching unit 58 and a video processing unit 60. Delay logic 50 includes miscellaneous logic circuitry 62 and a switching device 64. Incomming data lines are applied to switching device 64, for example exclusive OR gates. When the second input to exclusive OR gates 64 is held at a high level, the data is inverted and an inverted picture is presented on display 38. Miscellaneous logic 62 receives selected input signals from display 38 and generates specific function signals that are applied to delay memory 52. A binary counter 66 in miscellaneous logic 62 provides the address to memory sections 68 and 70 in delay memory 52. Memory sections 68 and 70 are shown as separate blocks for clarity. Binary counter 66 is reset to zero at the start of every television line and counts up to the number of bytes per horizontal line of data points that are being used. In the illustrated embodiment, by way of example, data is available in trains of four bit bytes, one byte per data point and one train for one horizontal line of data points. In one example, television monitor display 38 is a standard 525-line TV format with 512 horizontal lines.

As previously indicated, delay memory 52 includes memory sections 68 and 70, two memory sections being used to obtain three horizontal of data points at any one time. Each memory section 68 and 70 operates with exactly the same address and read/write commands from delay logic 50. Data is shifted serially into memory section 68, then out of memory section 68 into memory section 70. In this way, the output signals from memory sections 68 and 70 together with the data input lines make available, at any time, three bytes of data belonging to three data points in the vertical direction. The vertical distance between the centers of two data points is equal to four TV lines, for example, two even field lines and two odd field lines. The arrangement is such that the data at the output of delay memory 52 is the same for every two consecutive TV lines and is shifted every two lines after the previous data has been stored in latches 72, 74 and 76 in video weighting unit 56.

In addition to latches 72, 74 and 76, video weighting unit 56 includes and gate circuitry 78, programmable digital to analog converters 80, 82 and 84, convolution weighting resistors 86, and switching devices 88, 90, 92 and 94. The data at the output of switching device 64 is applied to latch 72 via AND gate circuitry 78 which also receives an enable signal from miscellaneous logic circuitry 62. Data from memory 68 and memory 70 are fed to latch 74 and latch 76, respectively. The enable signal generated by miscellaneous logic 62 is applied also to memory 68 and memory 70. The signal at the output of latch 72 is fed to digital to analog converter 80 and memory 68. Digital to analog converter 82 and memory 70 receive the output of latch 74. The signal at the output of latch 76 is applied to digital to analog converter 84. The signals generated by digital to analog converters 80, 82 and 84 are fed through convolution weighting resistors and switches 88, 90, 92 and 94 and are summed at the input of an amplifier 96 in video switching 58. That is, the output signals of digital to analog converters 80, 82 and 84 are weighted and summed into one signal at the input of amplifier 96. The weighting is according to point spread function determined constants which are different for the four TV lines. As previously indicated, the vertical distance between centers of two data points is equal to four TV lines. For each of the four TV lines, a different set of resistors in convolution weighting resistors 86 is switched to the input of summing amplifier 96. This switching provides a vertical convolution sum which is equivalent to the Y direction inner integral of equation (10).

The signal at the output of summing amplifier 96 is applied to a Gaussian matched filter or analog filter 98, for example a four-pole Paynter filter of the type described in U.S. patent application Ser. No. 825,693, which is an excellent approximation of the ideal Gaussian function. Analog filter 98 operates in the horizontal direction on the vertical direction weighted data in order to complete the point spread function on the input data applied to continuous tone image processor 40. The processed data at the output of analog filter 98 is applied to video processing unit 60 through an emitter follower 100 and switches 102, 104, 106 and 108, for example transistor switches. Command signals from a display mode switch 110 are applied through a display mode buffer 112 to transistor switches 102, 104, 106 and 108. In one particular switching mode, the signal at the output of digital to analog converter 80 is switched through switch 104 to provide an intensity modulated presentation in which each data point is shown as a square of constant intensity—the intensity is not influenced by adjacent data points. The square is four TV lines high and 333 nsec wide so that the center to center distance of data points is the same as for continuous tone images. The horizontal convolution, the outer integral of equation (10), is provided by analog Gaussian filter 98 which is approximated by a four-pole Paynter filter. The transfer function of Paynter filter 98 is specified by damping ratios $\zeta$ and natural frequencies $\omega_n$ according to the time-scaled Gaussian matched-filter standard deviation $\sigma$ and the imaging system full-width-half-maximums (FWHM) with the following prescription:

$$\frac{e_o(s)}{e_i(s)} = \frac{1}{\left[\left(\frac{s}{\omega_{n1}}\right)^2 + 2\zeta_1\left(\frac{s}{\omega_n}\right) + 1\right]\left[\left(\frac{s}{\omega_{n2}}\right)^2 + 2\zeta_2\left(\frac{s}{\omega_n}\right) + 1\right]} \quad (11)$$

where
$$\zeta_1 = 0.842 \quad \zeta_2 = 0.277$$
$$\omega_{n1} = 0.643\,\omega_c \quad \omega_{n2} = 1.129\,\omega_c$$

and
$$\omega_c = \frac{2}{\sqrt{3}\,\sigma}; \quad \sigma = \frac{FWHM}{2.35} \text{ (matched filter)}$$

Restoration of the DC level, which changes when switching from line to line, is provided in video processing unit 60. It is to be noted that no zero adjustments or balancing for temperature dependence has been performed on any of the analog signal paths up to video processing unit 60. The selected signal at the output of switches 102, 104, 106 and 108 is applied to a DC restoration circuit 114 via an amplifier 116. D.C. restoration circuit 114, for example a sample-hold amplifier, puts the zero level of each TV line, during the retrace, exactly on the same point and ensures that a smooth picture is presented on the screen of display 38. After restoration of the DC level, the signal at the output of sample-hold amplifier 114 is distributed to display 38, and-/or magnetic video tape recorders and printers 118 via emitter followers 120.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An image display system comprising:
   (a) computer processing means for generating digital data signals representing an image to be displayed;
   (b) display means connected to said computer processing means, said image displayed on said display means; and
   (c) continuous tone image processor means connected to said display means for generating a final display signal, said continuous tone image processor means including means for generating an intermediate signal representing vertical convolution of said digital data signals and analog filter means for generating said final signal representing horizontal convolution of said intermediate signal, said final signal applied to said display means for continous analog image presentation on said display means.

2. The image display system as claimed in claim 1 wherein said computer processing means includes detector means and processing electronic means, said digital data signals defining the condition of a biological specimen, said detector means sensing intensity values at specified locations of said biological specimen and generating data signals which are applied to said processing electronic means, said processing electronics means generating said digital data signals.

3. The image display system as claimed in claim 2 wherein said means for generating said intermediate signal includes digital to analog converter means and summing means for generating said intermediate signal.

4. The image display system as claimed in claim 3 wherein said digital data signals define intensity values in a vertical slice of interest which are multiplied by a Gaussian function in said digital to analog converter means and are summed in said summing means to derive said intermediate signal on a given horizontal line.

5. The image display system as claimed in claim 4 wherein said digital to analog converter means includes a plurality of convolution weighting resistors and wherein said filter is a four-pole Paynter filter.

6. The image display system as claimed in claim 1 wherein said vertical and horizontal convolutions are in accordance with a brightness convolution which is defined by $$B(x, y) = \frac{B_o}{2\pi\sigma^2} \sum_{x_i=x_{min}}^{x_i=x_{max}} e^{-\frac{1}{2}\left(\frac{x_i - x}{\sigma}\right)^2} \sum_{y_i=y_{min}}^{y_i=y_{max}} e^{-\frac{1}{2}\left(\frac{y_i - y}{\sigma}\right)^2} f(x_i, y_i)\,dy_i\,dx_i,$$

said vertical convolution equivalent to the inner integral and said horizontal convolution equivalent to the outer integral.

7. An image display system comprising:
   (a) computer processing means for processing data signals defining the condition of a biological specimen, said computer processing means generating digital data signals representing digital sampling data and defining intensity values at specified X and Y locations of the biological specimen;
   (b) display means connected to said computer processing means for presenting an analog image of said digital data signals; and
   (c) continuous tone image processor means connected to said display means for generating a video signal defining an analog image of said digital sampling data, said analog image displayed on said display means by intensity mudulation of said digital data signals according to a two-dimensional Gaussian spread function.

8. The image display system as claimed in claim 7 wherein said continuous tone image processor means includes:
   (a) digital to analog converter means configured to receive said digital sampling data, said digital to analog converter means generating a signal representing vertical convolution of said digital sampling data;
   (b) summing means connected to said digital to analog converter means for summing said vertical convolution signal, an intermediate signal presented at an output of said summing means; and
   (c) Gaussian filter means connected to said summing means for horizontal convolution of said intermediate signal, a final signal at an output of said Gaussian filter means defining a Gaussian function for continuous analog image presentation on said display.

9. The image display system as claimed in claim 7 wherein said display means is a cathode-ray tube display having a scan beam, said continuous tone image processor means generating said video signal which produces an analog image of said digital sampling data by intensity modulation of said scan beam according to said two-dimensional Gaussian spread function.

10. The image display system as claimed in claim 7 wherein said computer processing means includes detector means and processing electronic means, said detector means sensing data signals related to a condition of said biological specimen and generating data signals defining said intensity values at specified X and Y locations, said data signals defining said intensity values at specified X and Y locations are applied to said processing electronic means said processing electronic means generating said digital data signals representing said digital sampling data.

11. The image display system as claimed in claim 10 wherein said continuous tone image processor means includes weighting means and switching means, said weighting means including digital to analog converter means and convolution weighting resistor means, said switching means including summing means and analog filter means, said digital to analog converter means receiving said digital data signals, analog signals at an output of said digital to analog converter means applied selectively to said convolution weighting resistor means, signals at an output of said convolution weighting resistor means summed at said summing means for vertical convolution of said digital data signals, said summed signals applied to said analog filter means for horizontal convolution.

12. The image display system as claimed in claim 11 wherein said analog filter means is a Paynter filter, the transfer function of said Paynter filter defined by $$\frac{e_o(s)}{e_i(s)} = \frac{1}{\left[\left(\frac{s}{\omega_{n1}}\right)^2 + 2\zeta_1\left(\frac{s}{\omega_n}\right) + 1\right]\left[\left(\frac{s}{\omega_{n2}}\right)^2 + 2\zeta_2\left(\frac{s}{\omega_n}\right) + 1\right]}$$

13. The image display system as claimed in claim 11 wherein said vertical and horizontal convolutions are in accordance with a brightness convolution which is defined by $$B(x, y) = \frac{B_o}{2\pi\sigma^2} \sum_{x_i=x_{min}}^{x_i=x_{max}} e^{-\frac{1}{2}\left(\frac{x_i - x}{\sigma}\right)^2} \sum_{y_i=y_{min}}^{y_i=y_{max}} e^{-\frac{1}{2}\left(\frac{y_i - y}{\sigma}\right)^2} f(x_i, y_i) \, dy_i \, dx_i,$$

said vertical convolution equivalent to the inner integral and said horizontal convolution equivalent to the outer integral.

14. The image display system as claimed in claim 13 wherein said continuous tone image processor means includes DC restoration means and wherein said display means in a cathode-ray tube television monitor, said DC restoration means connected to said television monitor, said signals at an output of said analog filter means applied to said DC restoration means for putting the zero level of each television line in said television monitor on the same point.

* * * * *